United States Patent [19]

Giorza et al.

[11] 4,039,068
[45] Aug. 2, 1977

[54] KEYBOARD OF ELASTIC MATERIAL FOR OFFICE MACHINES

[75] Inventors: Virgilio Giorza, Cuorgne (Turin); Piero Giovanetti, Ivrea (Turin), both of Italy

[73] Assignee: Ing. C. Olivetti & C., S.p.A., Ivrea (Turin), Italy

[21] Appl. No.: 641,684

[22] Filed: Dec. 17, 1975

Related U.S. Application Data

[63] Continuation of Ser. No. 422,331, Dec. 6, 1973, abandoned.

[30] Foreign Application Priority Data

Dec. 14, 1972 Italy .................................. 70909/72

[51] Int. Cl.² .............................................. B41J 5/08
[52] U.S. Cl. .................................. 197/98; 235/145 R; 200/166 C; 340/365 R
[58] Field of Search ......................... 197/98, 102, 103; 340/365 R; 235/145, 146; 200/166 C, 5 A, 5 R; 178/17 C

[56] References Cited

U.S. PATENT DOCUMENTS

| | | | |
|---|---|---|---|
| 1,041,696 | 10/1912 | Summerville | 197/102 |
| 2,947,404 | 8/1960 | Siebels et al. | 197/102 |
| 3,120,583 | 2/1964 | Cornell | 197/98 UX |
| 3,684,842 | 8/1972 | Boulanger | 200/5 R |
| 3,699,294 | 10/1972 | Sudduth | 200/5 A X |
| 3,760,137 | 9/1973 | Shimojo et al. | 200/166 C |
| 3,823,309 | 7/1974 | Caruso | 197/98 X |

*Primary Examiner*—Ralph T. Rader
*Attorney, Agent, or Firm*—Schuyler, Birch, Swindler, McKie & Beckett

[57] ABSTRACT

In an office machine keyboard comprising a layer of elastic material provided with individually depressible reliefs representing the keys, each having a top fingering surface, the characters are composed of a second elastic material moulded in accordance with the shapes of the characters and superimposed on the fingering surface.

The elastic keyboard is obtained pressing under heat a mould in which are inserted the two elastic materials.

2 Claims, 7 Drawing Figures

KEYBOARD OF ELASTIC MATERIAL FOR OFFICE MACHINES

CROSS REFERENCE TO A RELATED APPLICATION

This application is a continuation of U.S. application Ser. No. 422,331, filed Dec. 6, 1973 now abandoned.

BACKGROUND OF THE INVENTION

1. Field of the Invention

The present invention relates to an office machine keyboard comprising a layer of elastic material shaped with individually depressible reliefs constituting the keys of the keyboard.

2. Description of the Prior Art

Keyboards of elastic material solve the problems regarding, for example, infiltration of foreign bodies into the interior of keyboard itself, insulation of the fingering surface or area from any internal electrical apparatus there may be, and absorption of the noise typical of office machines.

These keyboards are generally mounted on a rigid supporting surface provided with holes allowing the passage of rigid shanks or stems which connect each key with the encoding device located on the said supporting surface.

A very important problem arising in keyboards of elastic material is the production of the characters corresponding to the keys.

One known solution to this problem provides for the formation of cavities or recesses having the form of characters in the fingering surfaces of the keys of elastic material; by filling the said cavities with material of a different colour, the characters themselves show up clearly.

This solution and other similar solutions are very complex and, moreover, good adhesion of the two elastic materials in the course of time is not certain, so that the character tends to become damaged, with negative aesthetic results.

Another known solution provides for the use of inserts on which the character is printed. These inserts are cemented to the bottom surface of a layer of transparent elastic material the top surface of which acts as the fingering surface.

This solution and other similar solutions have disadvantages connected with the complexity of the process of construction and with the problem of adhesion between the insert and the elastic material.

SUMMARY OF THE INVENTION

The keyboard of elastic material for office machines to which the present invention relates obviates these disadvantages and other inasmuch as the characters of the keys are obtained by moulding.

More particularly, the present keyboard of elastic material for office machines comprises a layer of a first elastic material shaped with individually depressible reliefs representing the keys, each having on the top a fingering surface, and a set of chracters made of a second elastic material, each being positioned on the fingering surface, the two elastic materials adhering to each other being vulcanized simultaneously, thus ensuring optimum adhesion. The keys are moreoever connected to the body of the keyboard through zones which are still of elastic material, but of smaller thickness, and are therefore endowed with a considerable resilience of movement. In fact, a slight pressure of the order of a few tens of grams is sufficient to actutate the keys and, therefore, the keyboard to which the present invention relates is capable of actuating any mechanical, electronic or electrical encoding system.

DESCRIPTION OF THE PREFERRED EMBODIMENT

The keyboard according to the invention consists of a cover 1 of elastic material on which stand out the keys 6, which are located in zones 4 in which the thickness of the cover is smaller than in the remainder of the keyboard. The characters 10 are located on the tops of the said keys. The characters are composed of elastic material of the same type as that used for the cover, but of a different colour.

The two elastic materials adhere to each other inasmuch as they are vulcanized simultaneously during the process of moulding the keyboard. The keyboard is obtained by a hot compression moulding process. All elastomers may be used in general, such as, for example, ethylene propylene, Hypalon, Kariflex and acrylonitrile rubber.

The keyboard is mounted on a rigid support provided with through holes which separates the keyboard itself from the encoding device. By pressing on the fingering surface, the key is deformed and comes into contact with rigid shanks which, extending through the said holes, transmit the movement to the switching device.

The keyboard, however, may also be used to actuate encoding devices located on the same rigid support, such as, for instance, encoding devices of capacitive type.

Figure 2:
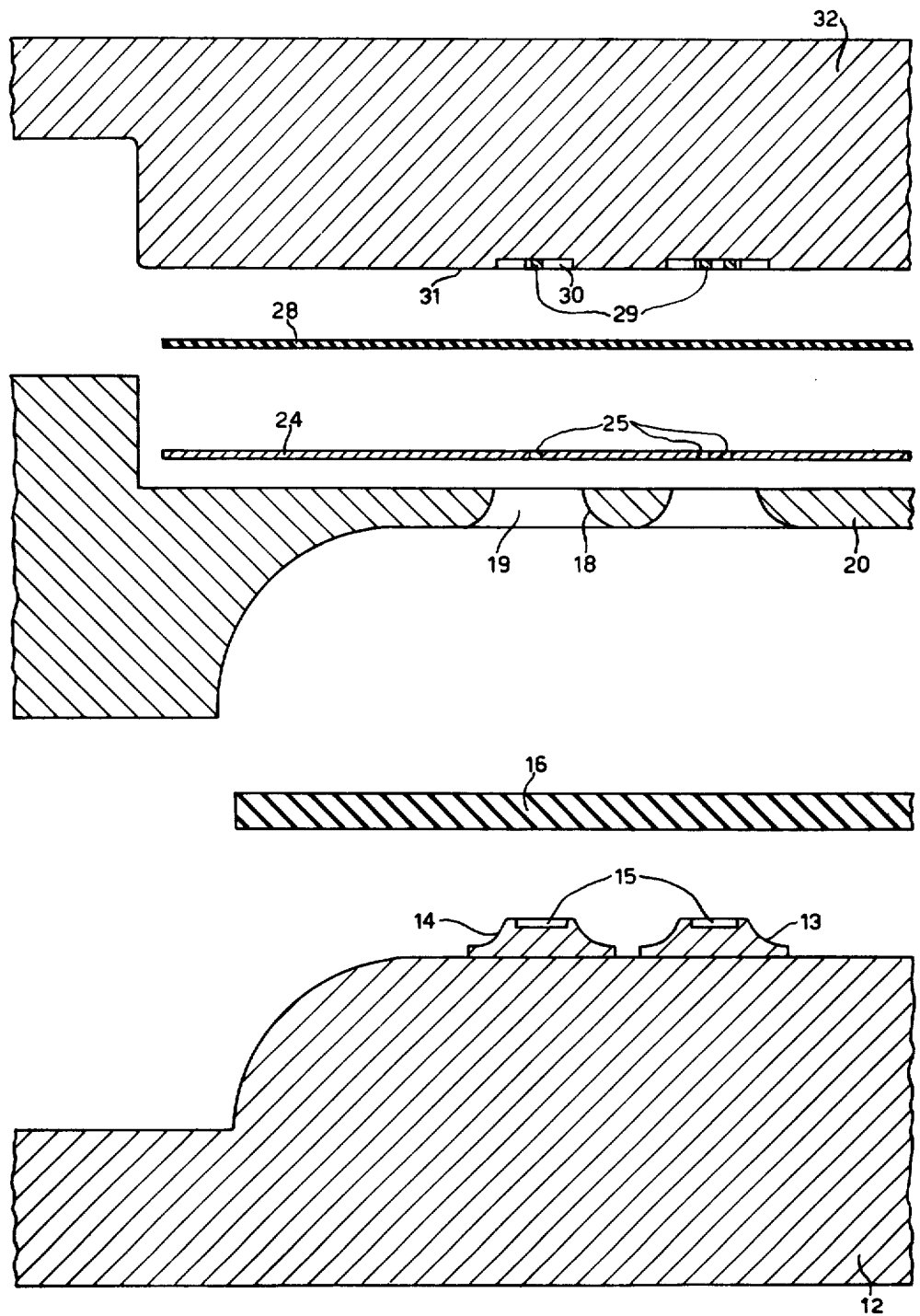
FIG. 2 is a partial exploded section of the various parts making up the mould, the two elastic materials being included.

FIG 2 is a partial exploded section of the various parts making up the mould, the elastic materials being included.

Starting from the bottom, the mould is formed by a male moulding tool or plate 12 provided with reliefs 13. The reliefs 13 have cavities 15 of circular cross-section. Over the male moulding tool there is arranged a sheet 16 of a first elastic material and above this a shaped upper plate 20 with through openings 19, the profiles 18 of which follow a course similar to the profiles 14 of the reliefs 13.

Figure 5:
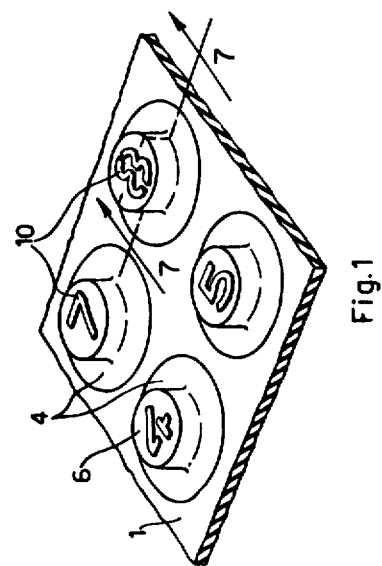
FIG. 5 is a partial plan view of the character moulding plate.
Figure 4:
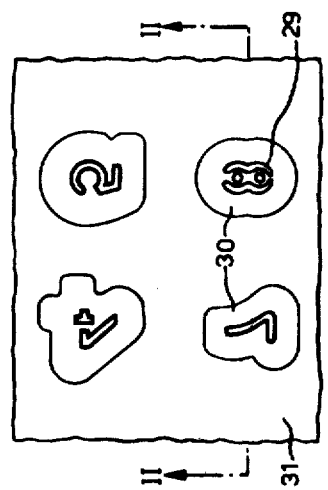
FIG. 4 is a partial plan view of the upper plate.
Figure 6:
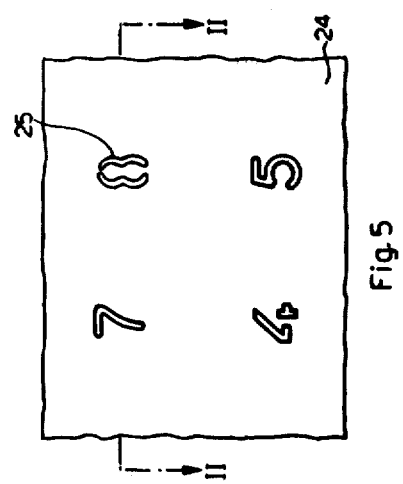
FIG. 6 is a partial plan view of the compression plunger.

Above the plate 20 there is positioned a thin plate 24 in which shaped through holes 25 (FIG. 5) comprising the marks forming the characters are formed. Over the last-mentioned plate there is positioned a thin sheet 28 of a second elastic material of a colour different from that of the first material.

Over the thin sheet 28 of elastic material is positioned the compression plunger 32, which is provided with depressions 30 within which the characters 29 are situated in relief.

The said characters are at the same level as the zones 31 which press on the second elastic material during the shearing or punching process.

The various parts are positioned as described and the mould is then closed and subjected to pressure under heat in accordance with the known techniques of hot moulding. The sheet 16 takes the final form of the keyboard and is therefore provided with strengthened reliefs on the top of the material occupying the cavities 15, while the thin sheet 28 is cut or shorn through and the characters obtained in this way are deposited on the top surface of the said reliefs. The shearing is effected by the relief characters 29 of the compression plunger 32 which, in the first stage of the process, presses the thin sheet 28 of the second elastic material against the appropriate through holes 25 in the form of characters in the plate 24, shearing the portion of elastic sheet necessary for forming the character on the cover.

The characters 29 on the moulding plunger 32 have dimensions smaller than those of the characters 25 in the plate 24. The result obtained by this expedient is that the amount by volume of the second elastic material which the plunger cuts away is smaller than the volume of the character in the moulding plate.

This expedient prevents burning of the cut characters on the cover. The best results are obtained by adopting dimensions of the shearing or cutting characters 29 such that the cut volume of the second elastic material is 15% - 20% less than the volume of the corresponding characters in the moulding plate.

In the second stage of the process, the two elastic materials are vulcanized together and therefore the characters in relief on the plane surface of the keys come to form part of the body itself of the cover.

Figure 1:
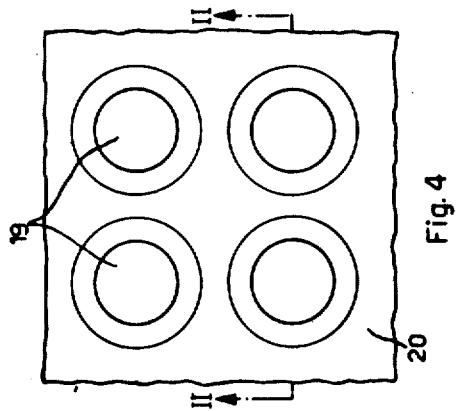
FIG. 1 is a partial view of the keyboard.
Figure 3:
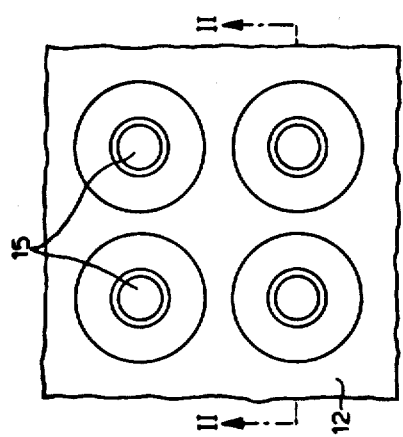
FIG. 3 is a partial plan view of the male moulding tool or plate.
Figure 7:
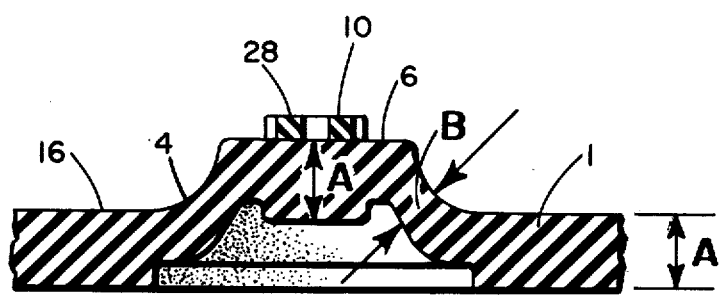
FIG. 7 is a cross-sectional view of one key in the keyboard of FIG. 1.

The keys 6 (FIG. 1) are positioned in the mould between the male moulding tool or plate 12 and the upper plate 20. The distance between the profiles 18 of the through openings 19 in the upper plate 20 and the profiles 14 of the reliefs 13 of the male moulding tool 12 is less than the distance between the other parts of the male moulding tool 12 and the upper plate 20, so that the thickness of the elastic material is smaller at these profiles and the aforesaid zones 4 having greater resilience are formed on the keyboard. The resilient zones 4 of reduced thickness B as compared to the thickness A of zone 16 and key actuating surface 6 is shown in FIG. 7.

Actuation of the keys 6 is thus possible with a pressure of the order of a few tens of grams; this enables the aforesaid keys to actuate any mechanical, electrical or electronic encoding system.

What we claim is:

1. An office machine keyboard comprising a continuous layer of a first vulcanizable elastic material having a predetermined colour, a plurality of keys comprising an array of individually depressible reliefs formed in said layer, each relief including a top fingering surface raised above and parallel to the remainder of said keyboard layer and a curvilinear zone of said first elastic material surrounding said top surface of each said relief and having a smaller thickness than said top surface or the remainder of the layer, said zone sloping downwardly and then laterally away from said top surface toward said remainder of said layer to resiliently elastically connect said depressible relief to said remainder of said layer, said reliefs being depressible without distention of said connecting zone, and a set of characters, each one of a second vulcanizable elastic material, each character being positioned on the top fingering surface of one of said corresponding reliefs and being vulcanized to said first elastic material, whereby said characters are intimately connected to said reliefs.

2. Keyboard as in claim 1, wherein each character is situated in relief on said fingering surface.

* * * * *